(12) United States Patent
Choi et al.

(10) Patent No.: US 7,778,973 B2
(45) Date of Patent: Aug. 17, 2010

(54) SYSTEM, METHOD, AND PROGRAM FOR SHARING PHOTOS VIA THE INTERNET

(76) Inventors: Tat Kuen Choi, 15419 SE. 59th St., Bellevue, WA (US) 98006; Eric Chi-Wah Choi, 15419 SE. 59th St., Bellevue, WA (US) 98006

( * ) Notice: Subject to any disclaimer, the term of this patent is extended or adjusted under 35 U.S.C. 154(b) by 449 days.

(21) Appl. No.: 11/804,570

(22) Filed: May 18, 2007

(65) Prior Publication Data
US 2008/0288499 A1 Nov. 20, 2008

(51) Int. Cl.
*G06F 17/00* (2006.01)
(52) U.S. Cl. .................. 707/628; 707/827; 715/716; 711/117
(58) Field of Classification Search ............ 707/10, 707/628, 827, 9, 100; 711/117; 715/716
See application file for complete search history.

(56) References Cited

U.S. PATENT DOCUMENTS

| | | | |
|---|---|---|---|
| 4,104,718 A * | 8/1978 | Poublan et al. ............... 707/8 |
| 6,532,312 B1 | 3/2003 | Corkran |
| 6,757,684 B2 | 6/2004 | Svendsen |
| 6,871,231 B2 | 3/2005 | Morris |
| 7,076,558 B1 | 7/2006 | Dunn |
| 7,508,419 B2 * | 3/2009 | Toyama et al. ........... 348/211.3 |
| 2002/0070982 A1* | 6/2002 | Hill et al. ................ 345/835 |
| 2002/0120757 A1* | 8/2002 | Sutherland et al. .......... 709/229 |
| 2003/0063771 A1* | 4/2003 | Morris et al. .............. 382/100 |
| 2003/0097410 A1 | 5/2003 | Atkins |
| 2003/0236831 A1* | 12/2003 | Ortiz et al. ................ 709/204 |
| 2003/0236832 A1* | 12/2003 | McIntyre et al. ............ 709/204 |
| 2004/0205168 A1 | 10/2004 | Asher |
| 2005/0198031 A1 | 9/2005 | Pezaris |
| 2005/0198305 A1 | 9/2005 | Pezaris |
| 2005/0281535 A1* | 12/2005 | Fu et al. ................... 386/69 |
| 2006/0101064 A1* | 5/2006 | Strong et al. ............... 707/102 |
| 2006/0156243 A1 | 7/2006 | Lee |
| 2007/0150856 A1* | 6/2007 | Warner et al. .............. 717/106 |
| 2008/0133658 A1* | 6/2008 | Pennington ................ 709/204 |

OTHER PUBLICATIONS

John Heinz, Awareness Information Sharing, and Privacy on the Facebook, 23 pages.*

* cited by examiner

*Primary Examiner*—John R. Cottingham
*Assistant Examiner*—Noosha Arjomandi
(74) *Attorney, Agent, or Firm*—Ariel S. Bentolila; Bay Area IP Group, LLC (57) ABSTRACT

A system for sharing files over a computer network via a hosting site is presented. The system includes a data storage space associated with the hosting. The space includes albums created by the one or more users for storage of related files. The albums include at least one level of sharing associated with each of the users, the level of sharing being in part assigned by users creating the albums. One or more accounts are associated with each user. The accounts allow the each of the users to access albums they created and albums that they are allowed access. An album creator creates the album. An album viewer views contents of the album. A file viewer views contents of the files. An album manager allows the one or more users to associate levels of sharing of the album and to modify the contents of the album.

13 Claims, 7 Drawing Sheets

Create New Album

| Welcome| Home | Your Account | Logout | klicklic |

Create Album

Name [                    ]

[Create Album]

SYSTEM, METHOD, AND PROGRAM FOR SHARING PHOTOS VIA THE INTERNET

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to Internet products. More particularly, the invention relates to a method of sharing digital photos through a photo-hosting site on the Internet.

BACKGROUND OF THE INVENTION

Sharing photos is a great way to bring family and friends together. There are many situations in the course of one's daily life where photo sharing can enrich relationships and create memories. There are many ways to share photos over the Internet. A relatively simple method is to send digital photo files as emails or email attachments to the intended recipients. In this method, photos are uploaded to an email server and recipients download the photos to their computer to view the photos. The photos are stored in the email servers, for example, without limitation, Yahoo Mail, Gmail, and Hotmail, and recipients can typically access the photos stored in the email servers via a link in the email sent by the sender. In some instances the photos are displayed within the body of the email.

Internet sites for sharing photos, such as, but not limited to, kodakgallery.com or flickr.com, are similar in concept to email hosting except that entire sites are dedicated to the hosting of photos. Typically, recipients contact photo hosting site servers via a link in an email sent by either the sender or the hosting site for the sender. These sites usually require recipients to register on their site before the photos can be accessed. If the recipient is already a registered user of the photo-sharing site, when the recipient logs in, a dialog box or web page typically appears which lists all of the photos or albums of photos that others have shared with the recipient in addition to the photos or albums that the recipient has shared with others.

Email and photo hosting sites only allow for one-way sharing. These methods do not enable multiple users to share photos in the same place. Using email, the users must each compose their own emails and send these emails to each other. The use of photo hosting sites does not allow recipients to add photos to the album for the sender to view. Instead, recipients must create separate albums on the hosting site in which to upload their photos.

Photos can also be shared in social networking sites such as, but not limited to, blog sites and club sites. With blog sites such as, but not limited to, myspace.com and blogspot.com, users are given spaces in servers of the blog sites for the uploading of files, which can be of various media, for example, without limitation, script, graphics, photos, videos, or other digital media. The contents of the space can usually be accessed by anyone and therefore are shared. However, there is little control over who can view files available through this form of sharing. Access to blog site space of a user can be restricted, for example, without limitation, as in facebook.com. However, those who can enter the space have the same level of access to all of the contents. Furthermore, blog sites are not versatile in sharing photos.

Club sites and group sites such as, but not limited to, Yahoo Groups are generally restricted to members. A group or club is given space in the hosting server for club sites. Members of the group or club can upload photos amongst other contents to the club or group space. Other members can view the photos by logging onto the group or club sites. Group or club sites usually have managers who can delete contents and authorize applications for membership. Typically, members of group or club sites have the same level of permission in regards to uploading photos or other contents to the club or group site. Club or group sites are not optimal for photo sharing as members who want to share photos with nonmembers cannot do so using the club or group site. Moreover, once the photos are uploaded to the group or club site, access of the photos cannot be selective as all members are able to access them.

Prior art also includes a method to allow uploaded files, described as loops, to be modified by contacts who have permission to access the files. According to this method a file is either modifiable or not modifiable. If the file is modifiable, this file may only be modified in specified ways. The specified method of modification is a property built into the file and is not contact specific. Any contact that accesses a modifiable file can modify the file. This method may enable contacts to modify the file against the wishes of the user who uploaded the file.

In view of the foregoing, there is a need for an improved method of sharing digital photos through the internet that enables multiple users to share photos in the same place, or album, and also enables users to control who may view and upload photos to this album.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A through 1E illustrate the flow of an exemplary photo-sharing site, in accordance with an embodiment of the present invention.

SUMMARY OF THE INVENTION

To achieve the forgoing and other objects and in accordance with the purpose of the invention, a system and method for sharing photos via the internet is presented.

In one embodiment, a system for sharing files over a computer network via a hosting site is presented. The system includes a data storage space associated with the hosting site and accessible to one or more users via the computer network, the space includes albums created by the one or more users for storage of related files, the albums include at least one level of sharing associated with each of the one or more users, the level of sharing being in part assigned by the one or more users creating the albums. One or more accounts are associated with each of the one or more users. The accounts allow the each of the users to access albums they created and albums that they are allowed access to by the level of sharing. An album creator creates the album. An album viewer views contents of the album. A file viewer for views contents of the files. An album manager allows the one or more users to associate levels of sharing of the album with one or more users and to modify the contents of the album. In a further embodiment, the levels of sharing include viewer, where users associated as such may view the album, contributor, where users associated as such may view the album and add files, manager, where users associated as such may manage the album by associating users as contributors to the album and creator, where users associated as such may delete the album and change the levels of sharing associated with users. In another embodiment, one or more users are associated with a group and the group may be associated with one or more levels of sharing for one or more albums. In another embodiment, the levels of sharing further include editor, where users associated as such may edit contents of files in the album. In still another embodiment, the levels of sharing may be time sensitive where the levels of sharing may expire after a specified interval has elapsed. In yet another embodiment, the user may refuse an associated level of sharing the album and as such access to the album.

In another embodiment, a system for sharing files over a computer network via a hosting site is presented. The system includes means for providing a data storage space, means for providing levels of sharing, means for providing user accounts, means for creating albums, means for viewing albums, means for viewing files in the albums and means for managing the albums. Further embodiments include means for editing the files and means for grouping users.

In another embodiment, a method for sharing files over a computer network via a hosting site is presented. The method includes accessing a data storage space associated with the hosting site via the computer network by one or more users, creating one or more albums in the space by the one or more users for storage of related files, associating at least one level of sharing for the albums for the one or more users, the level of sharing being in part associated by the one or more users creating the albums, setting up one or more accounts by each of the one or more users, the accounts allowing the each of the users to access albums they created and albums which they are allowed access to by the level of sharing, viewing contents of the album by the users, viewing contents of the files by the users and managing the albums by the users to associate levels of sharing of the albums and to modify contents of the albums. In a further embodiment, the associating further includes the one or more users associating viewer, to users that may view the album, contributor, to users that may view the album and add files and manager, to users that may manage the album by associating users as contributors to the album. In still another embodiment, the method further includes grouping one or more users into a group by the one or more users and associating the group with one or more levels of sharing for one or more albums. In another embodiment, the associating further includes the one or more users associating editor, to users that may edit contents of files in the album. In yet another embodiment, the associating further includes the one or more users associating may associate the levels of sharing to expire after a specified interval has elapsed. Another embodiment further includes refusing an associated level of sharing by the user and as such access to the album.

In yet another embodiment a method for sharing files over a computer network via a hosting site is presented. The method includes steps for accessing a data storage space, steps for creating one or more albums in the space, steps for associating at least one level of sharing for the albums, steps for setting up one or more accounts, steps for viewing contents of the album, steps for viewing contents of the files and steps for managing the albums. Further embodiments include steps for editing the files and steps for grouping users.

In another embodiment a computer program product for sharing files over a computer network via a hosting site is presented. The computer program product includes computer code that allows one or more users access to a data storage space over the network. Computer code creates one or more albums for storage of files in the space by instructions from the one or more users. Computer code associates at least one level of sharing for the albums for the one or more users, the level of sharing in part based on instructions from the users creating the album. Computer code sets up one or more accounts for each of the one or more users based on instructions from each the one or more users allowing each of the one or more users to access albums they created and albums which they are allowed access to by the level of sharing. Computer code allows the one or more users to retrieve information regarding contents of the album if the one or more users is allowed access by the level of sharing. Computer code allows the one or more users to retrieve contents of files in the album if the one or more users is allowed access by the level of sharing, computer code that allows one or more users to associate levels of sharing to the albums if the one or more users is allowed access by the level of sharing. Computer code allows one or more users to modify contents of the album if the one or more users is allowed access by the level of sharing. Computer-readable medium stores the computer code. Another embodiment further includes computer code that allows one or more users to edit files in the album if the one or more users is allowed access by the level of sharing.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein. Herein, unless otherwise stated, the words "photos" and "files" are used interchangeably to mean a digital file representation of photographs.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

There are situations in which one would like to create a photo album to which other people can upload photos, instead of sharing photos with one-way sharing. These situations typically involve people who share common experiences or common interests. Therefore, embodiments of the present invention provide a photo-hosting site able to host, for a single user, different photo albums, which are shared with and accessible by different groups of designated contacts. These contacts are able to add photos to the albums that these contacts share. To add versatility, the ability to add photos can be controlled in the preferred embodiment. There may be situations in which certain contacts who share an album are allowed to add photos while others sharing the same album are not allowed to add photos. For example, without limitation, if a person recently attended a class reunion function and wishes to start and share a photo album for the function, he may want to share the album with all of the members of the class. The creator of the album may also want all who attended the function to be able to add photos to the album, while those who did not attend the function to be able to view the album only.

The preferred embodiment of the present invention provides a photo-sharing site that enables users to assign different levels of sharing to contacts with whom photo albums are shared, and these users can assign levels of sharing with any number of contacts sharing the albums. The method of photo sharing used by the preferred embodiment is album based. Albums are created that can contain any number of photos. Photos can be added or deleted at any time by the user creating the album. The user creating the album can share the album with any number of contacts, and for each contact, the user creating the album can assign levels of sharing. Three exemplary levels of sharing according to an embodiment of the present invention are viewer, contributor, and manager. The viewer level gives the user the ability to view the album only. The contributor level gives the user the ability to view the album and to add photos to the album. The manager level enables the user to be a manager of the album. Besides having the ability to view and add photos to the album, a manager can invite other contacts to share the album. A manager can also assign one of the three levels of sharing to each of the contacts the manager invites to share, including, but not limited to, authorizing other contacts to be a manager. In the present embodiment, the highest level of control is maintained by the creator of the album, who can delete the entire album, change the level of sharing of sharing contacts or remove them from the sharing list at any time.

Some embodiments may also enable the user creating the album to create groups of contacts according to the level of sharing of the group. Various alternate embodiments of the present invention may include more levels of sharing, fewer levels of sharing, or different levels of sharing, such as, but not limited to, an album manager who may view and manage the album but may not add contacts or assign levels of sharing to the contacts. Other possible levels of sharing that may be allowed include the ability to take specific actions, e.g. add comments and/or tags, download photos at full resolution and editing photos, may be designated as levels of sharing. Furthermore, the names used for these exemplary levels of sharing, viewer, contributor, and manager, may be different in alternate embodiments. For example, without limitation, in some embodiments, a level of sharing equivalent to the manager level may be referred to as an editor level.

The preferred embodiment of the present invention provides a higher level of flexibility of sharing in that contacts may be enabled to view photos, add photos, and even manage the album. Furthermore, the creator of the album is able to decide which contacts are assigned to each level of sharing. Thus, referring to a class reunion function as a non-limiting example, if the class president desires to create a photo album of the function and share it with members of the class, he first logs onto a photo-sharing site and creates a photo album. The class president may then add photos to the album. The class president then creates a contact list, comprising members of the class for which he has contact information, such as, but not limited to, email addresses, or if the class president has a contacts list, select from the list those who are members of his class. The class president may not have the contact information on all members of the class. He therefore, may designate several contacts on the class member contact list as managers of the album to help with contacting members of the class for which he does not have contact information. For the remaining contacts on his list, those who did not attend the function may be designated as viewers so that they may view the photos. Those who attended the function may be designated as contributors so that they may be able to add photos of their own if they wish.

Figure 1A:
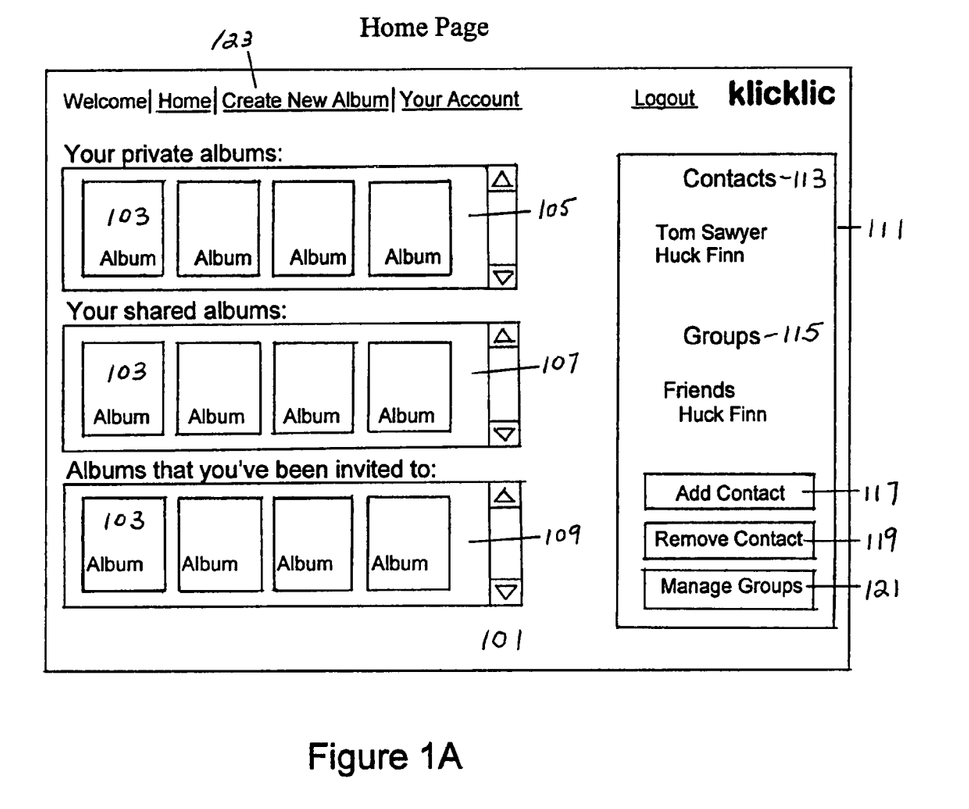
FIG. 1A shows an exemplary home page.
Figure 1B:
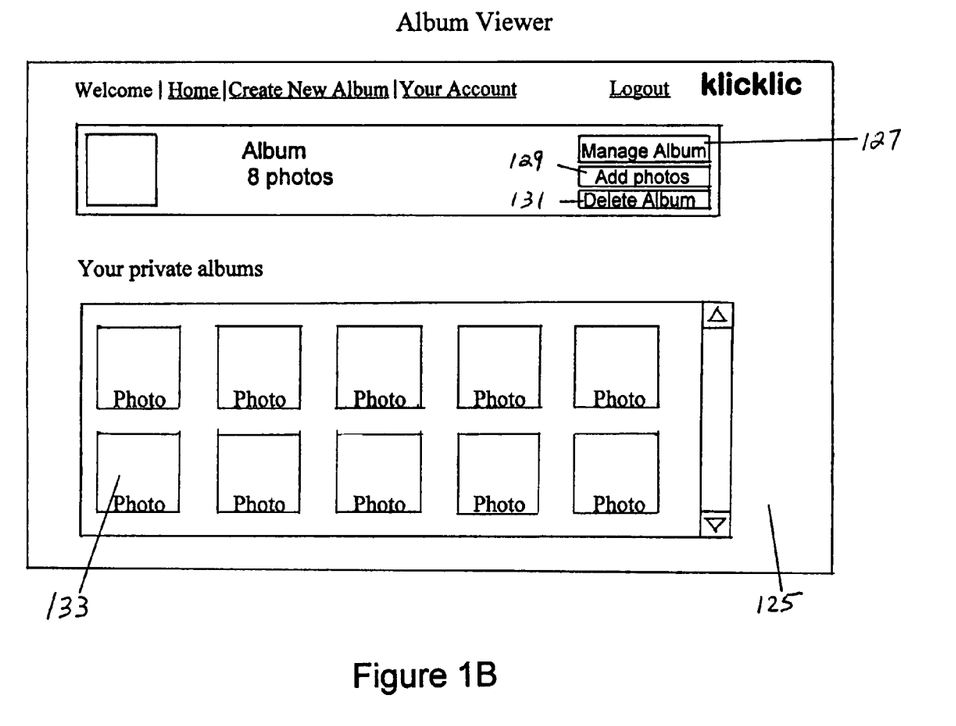
FIG. 1B shows an exemplary album viewer page.
Figure 1C:
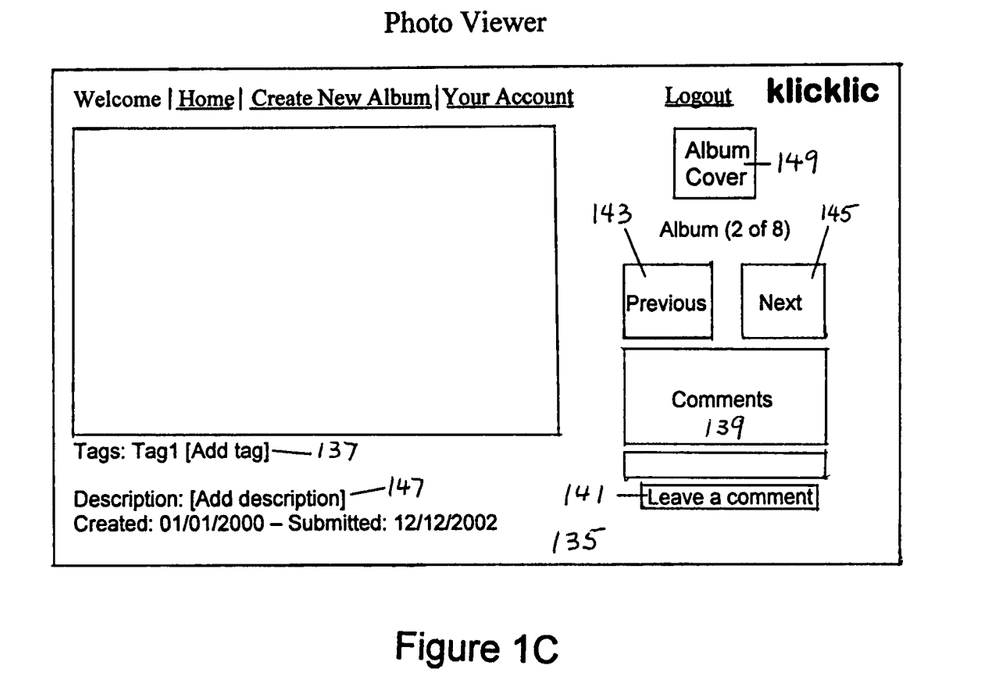
FIG. 1C shows an exemplary photo viewer page.
Figure 1D:
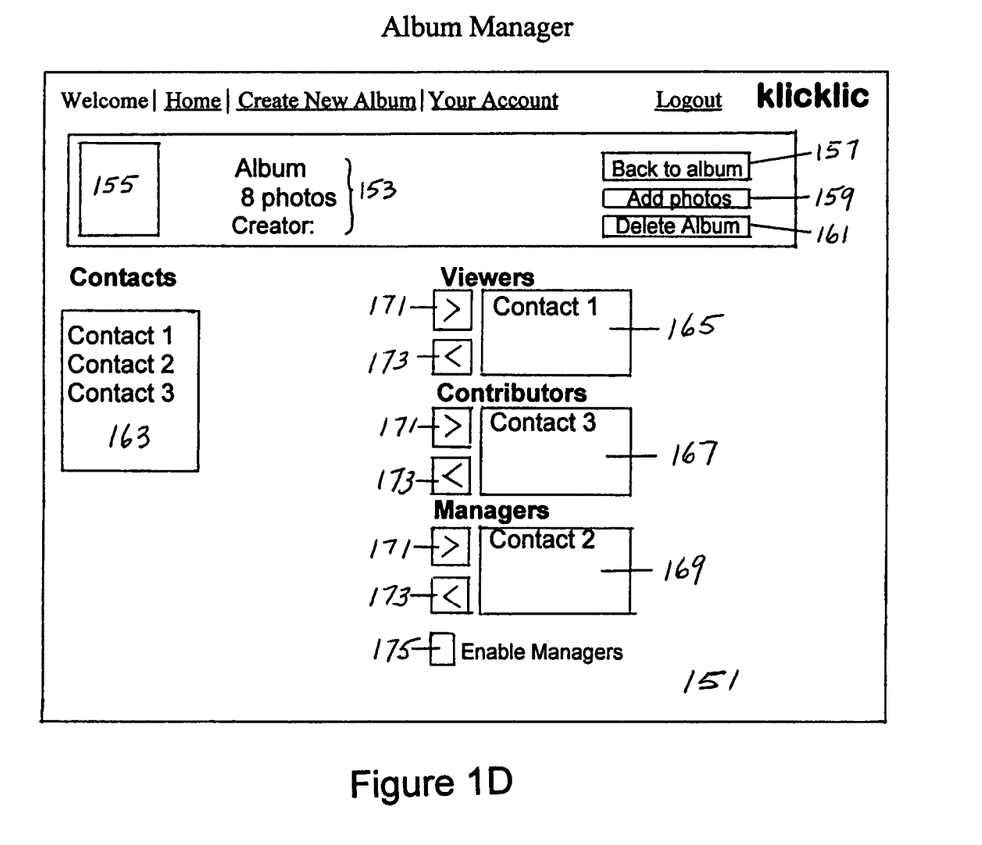
FIG. 1D shows an exemplary album manager page.
Figure 1E:
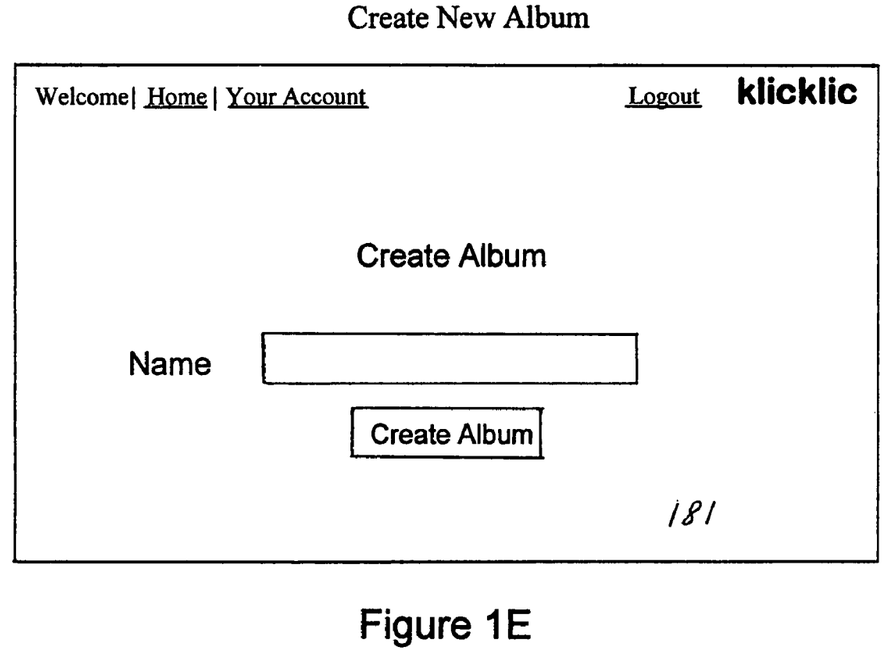
FIG. 1E illustrates an exemplary create new album page.

FIGS. 1A through 1E illustrate the flow of an exemplary photo-sharing site, in accordance with an embodiment of the present invention. FIG. 1A shows an exemplary home page 101. FIG. 1B shows an exemplary album viewer page 125. FIG. 1C shows an exemplary photo viewer page 135. FIG. 1D shows an exemplary album manager page 151, and FIG. 1E illustrates an exemplary create new album page 181. The pages of the photo-sharing site shown in FIGS. 1A through 1B are exemplary representations, and those skilled in the art, in light of the present teachings, will recognize that the layout of these pages may very greatly in various embodiments.

A user of an Internet site constructed optimally to host an album sharing function in accordance with the present embodiment of the present invention is directed to home page 111 once the user logs onto the site. From home page 101, the user is able to perform functions including, but not limited to, the following. The user may click on the albums he has created and view, add or delete photos. The user may click on albums shared by his contacts and view, add photos or manage the albums. In albums shared with him by his contacts, the user may be limited in what he can do depending on the level of sharing authorized by the contacts that created the albums. From home page 101, the user may also create a new album and start adding photos and managing the album, by clicking on the Create New Album link 123 and be directed to Create New Album page 181.

Home page 101 lists album thumbnails 103 that the user can access categorized into three boxes, a private album box 105, a shared album box 107, and an invitation box 109.

Private album box 105 comprises representations of all albums created by the user but not finished or shared. The user may also wish to keep albums that he does not want to share in private album box 105. Shared album box 107 comprises representations of all of the albums that the user has created and shared with others. Invitation box 109 comprises representations of all of the albums that other users have created and shared with the user. In the present embodiment album thumbnails 103 in each box may be divided into groups according to parameters indicated by the user. In alternate embodiments the home page may list all of the user's albums in one list instead of separating the albums into different boxes. In these embodiments information about the album, such as, but not limited to, the creation date, the creator, and the level of sharing assigned to the user, may be listed with the thumbnail.

In the present embodiment, a contact box 111 at the right side of home page 101 comprises a contacts list 113 and a groups list 115. From contacts list 113 or groups list 115, the user selects contacts or groups of contacts with which to share an album or albums. Also present are several buttons. The buttons shown by way of example in FIG. 1A are an add contact button 117, a remove contact button 119, and a manage groups button 121. Add contact button 117 enables the user to add contacts to contact list 113. Remove contact button 119 enables the user to remove contacts from contact list 113. Manage groups button 121 enables the user to create or modify groups. Those skilled in the art, in light of the present teachings, will recognize that additional or alternate buttons may be included to perform various different functions such as, but not limited to, rename contacts or groups, add groups, remove groups. Also, in alternate embodiments, these buttons may have various different names. For example, without limitation, remove contact button 119 may be named delete contact, erase contact, etc in alternate embodiments.

Clicking on an album thumbnail 103 or a view icon, which may be included in some embodiments, on home page 101 directs the user to album viewer page 125, shown by way of example in FIG. 1B. On album viewer page 125, all photos in the album selected by the user are represented. An album as displayed on album viewer page 125 is shown by way of example in FIG. 2.

In the present embodiment, on album viewer page 125 is a dialog box with a manage album button 127 from which the user can be directed to album manager page 151, an add photos button 129 and a delete album button 131. All of the buttons are present if the album is being accessed by the creating user. However, if the album is being access by a contact who is only authorized as a viewer, this dialog box is not present. If the album if being accessed by a contact who is authorized as a contributor, the dialog box is present; however, only add photos button 129 is present so that the contact may add photos. Some embodiments may enable contacts contributing photos to delete photos that they add. In the present embodiment, if the album is accessed by a contact who is authorized as a manager, manage album button 127 and add picture button 129 are both be present; however, delete album button 131 is absent. In alternate embodiments all buttons may be present to all viewers; however, if an unauthorized viewer attempts to use one of these buttons, he will not be allowed to perform that action and a message such as, but not limited to, "error" or "unauthorized user" may be displayed on the screen.

On album viewer page 125, clicking on a photo thumbnail 133 or a view icon in the representation of a photo, which may be included in some embodiments, directs the user to photo viewer page 135, shown by way of example in FIG. 1C. In the present embodiment a photo corresponding to the photo thumbnail selected by the user on album viewer page is displayed on the photo viewer page 135. The way the photo is displayed can be specified by the user, for example, without limitation, in a separate window, in a slideshow, or as a full screen. Common actions, such as, but not limited to, adding a tag 137 or leaving comments in a comment box 139 may also be performed by the user depending on whether these functions are designated as specific levels of sharing and whether the user is authorized. A leave a comment button 141 is included in the present embodiment. Tags and comment already present can be perused by any user. A previous button 143 and a next button 145 enable the user to browse through the photos in the album. The present embodiment also displays photo information 147, and an album cover thumbnail 149 on photo viewer page 135. In alternate embodiments various additional action buttons, such as, but not limited to, a change album name button or a change cover photo button, may also be included. Other actions that may be performed on the album viewer page include adding album information such as name of creator, number of photos, date of creation, description of album, names of contributors, etc.

In the present embodiment, album manager page 151, shown by way of example in FIG. 1D, can be reached by clicking manage album button 127 on album viewer page 125 or a manage icon, which may be included in the representation of an album on home page 101 in some embodiments. Album information 153 on the album to be managed appears at the top of album manager page 151 next to an album thumbnail 155 to the right of which are several buttons, a back to album button 157 that returns the user to album viewer page 125, an add photos button 159, and a delete album button 161. Delete album button 161 is only present if this page is accessed by the creating user. In some embodiments delete album button 161 may be present for all viewers; however, in these embodiments, only authorized users may use delete album button 161. In alternate embodiments, users who are not authorized as managers may not be able to access album manager page 151.

In the present embodiment, a contacts list 163 appears on the left side of album manager page 151. Contact list 163 lists contacts that are able to access the album. Album manager page 151 also comprises boxes to indicate what level of sharing for which each contact is authorized. The present embodiment comprises a viewer box 165, a contributors box 167, and a managers box 169. This controls which contacts are able to view, contribute to and manage the album. To initiate sharing in the present embodiment, a contact is selected from contact list 163. The present embodiment comprises a directional arrow 171 pointing to the right and a directional arrow 173 pointing to the left for each of the sharing level boxes. The sharing level is assigned by clicking on the directional arrows 171 pointing to the right corresponding to the level of sharing being assigned to add the user to that list. Selecting contacts on one of the lists on the right and clicking the directional arrow 173 pointing to the left removes the contact from those lists. In alternate embodiments add buttons and remove buttons may be used instead of arrow buttons or the arrow buttons may be pointing in various different directions, such as, but not limited to up and down, depending on the layout of album manager page 151. The preset embodiment also has an enable managers box 175. When the enable manager box is selected, the selection of managers from the contact list to be added to the Managers box 169 is enabled (this is an optional feature). Some embodiments enable the user creating the album to withdraw permission to share from any contact.

In the present embodiment, along the top of home page 101 is a group of links, one of which is a create new album link 123. Create new album link 123 leads to a create new album page 181, shown by way of example in FIG. 1E, from which new albums can be created.

FIG. 1e illustrates an exemplary create new album page in accordance with an embodiment of the present invention. A new album is given a title and by clicking on the Creat Album button, the user is direct to a page where photos can be selected and uploaded to the hosting site. Once an album is created, the album appears in private albums box 105 on home page 101. The album appears in shared albums box 107 once the album is shared with one or more contacts or groups.

Figure 2:
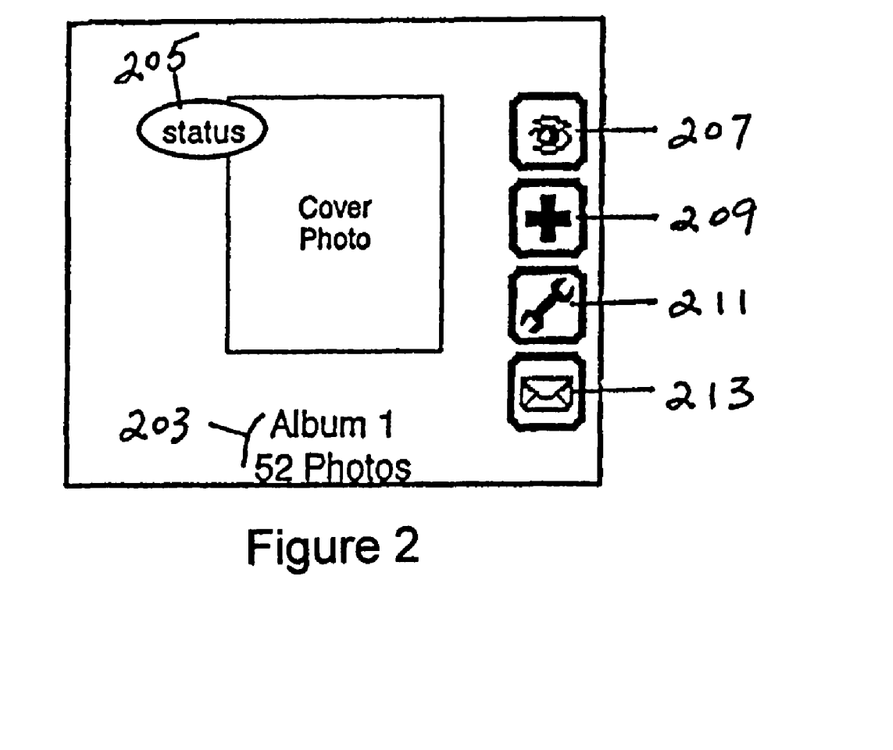
FIG. 2 illustrates a detailed view of an exemplary album on a home page as viewed on a photo-sharing site, in accordance with an embodiment of the present invention.

FIG. 2 illustrates a detailed view of an exemplary album on home page 101 as viewed on a photo-sharing site, in accordance with an embodiment of the present invention. An icon, which is a thumbnail 201 of a cover photo for the album, is central to the representation. Below thumbnail 201 is album information 203, including, but not limited to, the title of the album and the number of photos in the album. In some embodiments, in the upper left corner, there may be a status icon 205 indicating if the album has been recently updated, for example, without limitation, recently created or recently having photos added. Along the right edge are several action icons. These action icons provide quick access to common actions for albums. In the present embodiment, there is a viewing icon 207, a photo-adding icon 209, a managing icon 211 and a sharing or an Email icon 213. The action icons are present in the representation of all albums created by the user. For albums shared by other users, the availability of action icons depends on the sharing level for which the user is authorized. If the user is authorized as a viewer as assigned by the album creator, only viewing icon 207 is present in the representation of the album. If the user is authorized as a contributor, viewing icon 207 and photo-adding icon 209 are present. If the user is authorized as a manager, viewer icon 207, photo-adding icon 209, managing icon 211, and Email icons 213 are present. In alternate embodiments action icons may sill be present but disabled for unauthorized users. Also, those skilled in the art, in light of the present teachings, will recognize that alternate embodiments may have various different action icons such as, but not limited to, a next album icon, a previous album icon, or a close album icon. other possible icons that may be displayed with the album include icons for delete albums, and rename albums.

Figure 3:
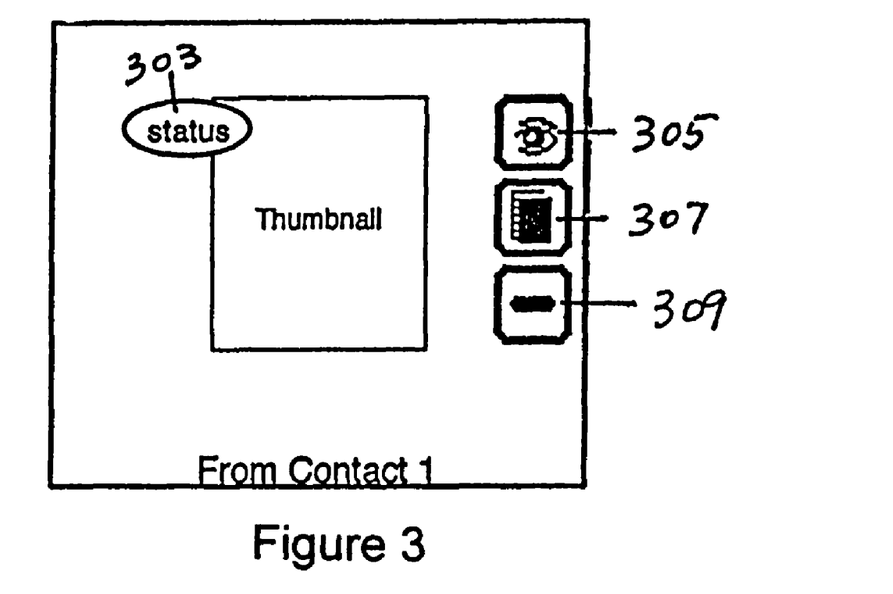
FIG. 3 illustrates an exemplary photo on a photo viewer page as viewed on a photo-sharing site, in accordance with an embodiment of the present invention.

FIG. 3 illustrates an exemplary photo on photo viewer page 135 as viewed on a photo-sharing site, in accordance with an embodiment of the present invention. Central to the representation is a thumbnail 301 of the photo. A status icon 303 may be displayed in the upper left corner to indicate if the photo has been recently added or modified. In the present embodiment, action icons are located on the right of thumbnail 301 and comprise a viewing icon 305 to view the photo, a make cover icon 307 allowing the photo to be designated as the cover of the album, and a remove icon 309 to delete the photo from the album. The preferred embodiment only displays to users the buttons and icons appropriate to the level of sharing for which the user is authorized. Therefore, make cover icon 307 and remove icon 309 are present only when the album is being accessed by the user creating the album. In alternate embodiments all of the buttons may be present for all viewers; however, some of the action buttons may be disabled for unauthorized viewers. Furthermore, various alternate embodiments may have various different icons such as, but not limited to, a send icon, a name or rename icon, a next photo icon, and a previous photo icon. Other possible icons that may be displayed with the photo include icons for emailing the photo, edit, and download.)

The above illustration of a class reunion function is a non-limiting example of a shared experience for which this method of photo sharing is appropriate. Other examples include, without limitation, birthday parties, weddings, family reunions, Christmas parties, office parties, picnics, outings, etc. Shared interest is another area where a method of photo sharing according to embodiments of the present invention is appropriate. Shared interests include, without limitation, hobbies, such as, but not limited to, stamp collection, antique collection, model building, etc, activities, such as, but not limited to, bird watching, photography, or woodworking. Thus, for example, without limitation, a member of a bird watching club can start an album of local birds and share it with other members with an invitation to add photos to the album. This user may also share the album with nonmember friends who may only be allowed to view the album. The user may also give permission to other members to manage the album if he so desires.

In alternate embodiments, the same method of the ability to assign different levels of sharing may be applied to albums of videos or written documents. For example, without limitation, a user with interest in writing poems can create and share an album of poems on a topic to which he and his poetry-writing friends can contribute. Other friends can be invited to view the poetry album; however, the user may wish to restrict the friends who are not poetry writers from adding files to the album by assigning these contacts to a lower sharing level. Another non-limiting example is that of a user with an interest in cooking. This user can create an album of original recipes for cooking certain food items, and the user can share this with his cooking friends with invitations to contribute recipes, while his non-cooking friends may only be allowed to view the recipes. A sharing method according to an embodiment of the present invention can also be applied to videos. Using the activity of bird watching as a non-limiting example, an album of videos of local birds can be created and shared in a method according to an embodiment of the present invention.

Figure 4:
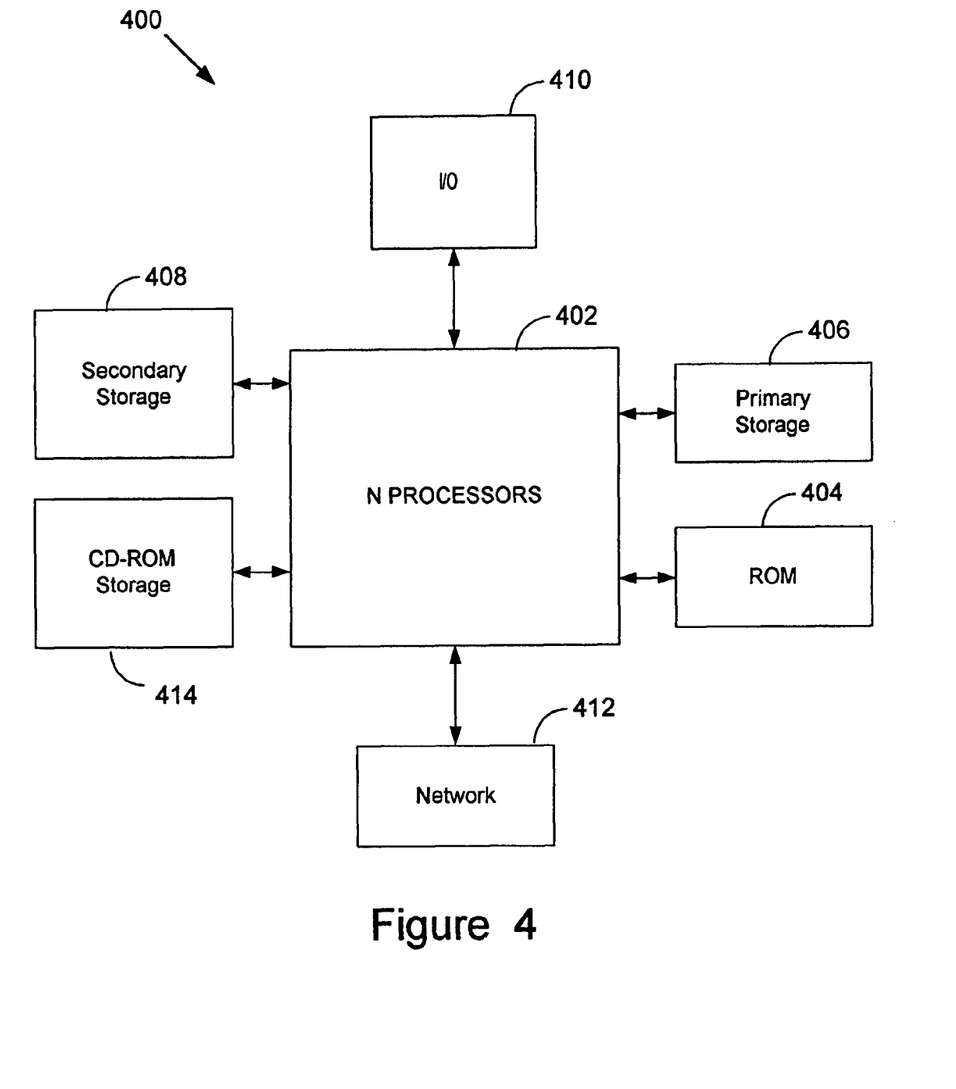
FIG. 4 illustrates a typical computer system that, when appropriately configured or designed, can serve as a computer system in which the invention may be embodied.

FIG. 4 illustrates a typical computer system that, when appropriately configured or designed, can serve as a computer system in which the invention may be embodied. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described above. A mass storage device 408 may also be coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications or internet network using an external connection as shown generally at 412, which may be implemented as a hardwired or wireless communications link using suitable conventional technologies. With such a connection, it is contemplated that the CPU might receive information from the network, or might output information to the network in the course of performing the method steps described in the teachings of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA. For example, while it is conceivable that almost all the above methods or steps can be practiced outside of the jurisdiction of the USA, if the user is located within the USA, when he/she logs on to the hosting site, thumbnails or links of albums containing photos which has been process by this new method are downloaded to their computer/PDA/cellphone. Hence, in most practical applications, this step has to be practiced within the USA, while the others may be performed and/or located outside of the jurisdiction of the USA while the remaining method steps and/or system components of the forgoing embodiments are typically required to be located/performed in the US for practical considerations.

The following are some examples of how this method can be used in other applications. The same method of the ability to assign different levels of sharing can be configured to be applied to albums of videos or script.

For example, a user with interest in writing poems can create and share an album of poems on a topic to which he and his poetry writing friends can contribute, other friends are invited to view. A user with interest in cooking can create an album of original recipes of cooking certain special food items, he can share this with his chef friends with invitations to contribute recipes, his non-chef friends are allowed only to view the recipes.

Similarly, the same sharing method can be configured to be applied to videos. Using the bird watching activity again as an example, an album of videos of local birds can be created and shared in the same way.

Having fully described at least one embodiment of the present invention, other equivalent or alternative means for implementing a method of sharing photos over the Internet according to the present invention will be apparent to those skilled in the art. For example, without limitation, alternate embodiments may include various different action buttons or sharing levels. In some embodiments the photo-sharing site may not be album based. For example, without limitation, some embodiments may be subject or activity based, where the user can create a subject group that may contain one or more albums or individual photos. In these embodiments, contacts along with their sharing levels are assigned to the subject groups rather than albums. These embodiments enable a user to share multiple albums easily with a group of people who most likely share an interest in the same subject or activity. The invention has been described above by way of illustration, and the specific embodiments disclosed are not intended to limit the invention to the particular forms disclosed. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A system for sharing files over a computer network via a hosting site, the system comprising:

a central processing unit (CPU);

a memory;

a data storage space associated with the hosting site and accessible by one or more users via the computer network, said data storage space comprising albums created by said one or more users for storage of related files, said albums comprising at least one different level of sharing associated with each of said one or more users, said different level of sharing being in part assigned by said one or more users creating said albums;

accounts associated with each of said one or more users, one or more accounts of the user accounts allowing said each of said users to access said albums wherein said users who created said albums are allowed to access to said different level of sharing, wherein said different level of sharing is time sensitive and is expired after a specified interval has elapsed;

an album creator for creating an album;

an album contributor for viewing and adding contents of said album;

an album viewer for viewing contents of said album;

a file viewer for viewing contents of said files; and an album manager for allowing said one or more users to associate different levels of sharing of said album and to modify the contents of said album, where said different levels of sharing comprise said album viewer who is associated with viewed contents is only authorized to view said album, said album contributor who is associated with contributed contents is only authorized to view said album and add files, said album manager who is associated with managed contents is only authorized to manage said album by associating users as contributors to said album, and said album creator who is associated with created contents is only authorized to delete said album and change said different levels of sharing associated with users.

2. The system for sharing files as recited in claim 1, in which one or more users are associated with a group and said group may be associated with one or more levels of sharing for one or more albums.

3. The system for sharing files as recited in claim 1, in which said levels of sharing further comprise editor, where users associated as such may edit contents of files in said album.

4. The system for sharing files as recited in claim 1, in which said user may refuse an associated level of sharing said album and as such access to said album.

5. A system for sharing files over a computer network via a hosting site, the system comprising:

a central processing unit (CPU);

a memory;

means for providing a data storage space, the data storage space associated with the hosting site and accessible by one or more users via the computer network, said data storage space comprising albums created by said one or more users for storage of related files, said albums comprising at least one different level of sharing associated with each of said one or more users, said different level of sharing being in part assigned by said one or more users creating said albums;

means for providing different levels of sharing;

means for providing user accounts, one or more accounts of the user accounts associated with each of said one or more users, said user accounts allowing each of said users to access said albums, wherein said users who created said albums are allowed to access to said different levels of sharing;

means for creating said albums;

means for contributing to view and add contents of said albums;

means for viewing said albums;

means for viewing files in said albums; and means for managing said albums for enabling said one or more users to associate different levels of sharing of at least one album and to modify the contents of said albums, wherein said different level of sharing is time sensitive and is expired after a specified interval has elapsed and wherein said different levels of sharing at least comprise an album viewer who is associated with viewed contents is only authorized to view said album, an album contributor who is associated with contributed contents is only authorized to view said album and add files, an album manager who is associated with managed contents is only authorized to manage said album by associating users as contributors to said album, and an album creator who is associated with creating contents, is only authorized to delete said album and change said levels of sharing associated with users.

6. The system for sharing files as recited in claim 5, further comprising means for editing said files.

7. The system for sharing files as recited in claim 5, further comprising means for grouping users.

8. A method for sharing files over a computer network via a hosting site, the method comprising:

accessing a data storage space associated with the hosting site via the computer network by one or more users, the data storage space associated with the hosting site and accessible by said one or more users via the computer network, said data storage space comprising albums created by said one or more users for storage of related files, said albums comprising at least one different level of sharing associated with each of said one or more users, said different level of sharing being in part assigned by said one or more users creating said albums;

providing user accounts, one or more accounts of the user accounts associated with each of said one or more users, said user accounts allowing said each of said users to access said albums said users who created said albums are allowed to access to said different level of sharing;

creating one or more albums in said space by said one or more users for storage of related files;

associating different levels of sharing for said albums for said one or more users, wherein said different level of sharing is time sensitive and is expired after a specified interval has elapsed and wherein the different levels of sharing being in part associated by said one or more users creating said albums for associating a viewer who is authorized only to view said albums, a contributor authorized only to view said albums and add files, and a manager who is authorized only to manage said albums by associating users as contributors to said albums;

setting up the one or more accounts by each of said one or more users, said user accounts allowing said each of said users to access said albums, wherein said users who are created said albums are allowed access to by said different levels of sharing;

viewing contents of said albums and contents of files by said users; and managing said albums by said users to associate different levels of sharing of said albums and to modify contents of said albums.

9. The method for sharing files as recited in claim 8, further comprising grouping one or more users into a group by said one or more users and associating said group with one or more levels of sharing for one or more albums.

10. The method for sharing files as recited in claim 8, in which said associating further comprises said one or more users associating editor, to users that edit contents of files in said album.

11. The method for sharing files as recited in claim 8, further comprising refusing an associated level of sharing by said user and as such access to said album.

12. A computer program product stored in a computer readable storage medium for sharing files over a computer network via a hosting site, the computer program product comprising:

a computer code that accesses a data storage space associated with the hosting site via the computer network by one or more users, the data storage space associated with the hosting site and accessible by said one or more users via the computer network, said data storage space comprising albums created by said one or more users for storage of related files, said albums comprising at least one different level of sharing associated with each of said one or more users, said different level of sharing being in part assigned by said one or more users creating said albums;

a computer code that provides user accounts, one or more accounts of the user accounts associated with each of said one or more users, said user accounts allowing said each of said users to access said albums, said users who created said albums are allowed to access to said different level of sharing;

a computer code that creates one or more albums in said space by said one or more users for storage of related files;

a computer code that associates different levels of sharing for said albums for said one or more users, wherein said different level of sharing is time sensitive and is expired after a specified interval has elapsed and wherein the different levels of sharing being in part associated by said one or more users creating said albums for associating a viewer who is authorized only to view said albums, a contributor authorized only to view said albums and add files, and a manager who is authorized only to manage said albums by associating users as contributors to said albums;

a computer code that sets up the one or more accounts by each of said one or more users, said user accounts allowing said each of said users to access said albums, wherein said users who are created said albums are allowed access to by said different levels of sharing;

a computer code that views contents of said albums and contents of files by said users; and a computer code that manages said albums by said users to associate different levels of sharing of said albums and to modify contents of said albums.

13. The computer program product for sharing files as recited in claim 12, further comprising computer code that allows one or more users to edit files in said album if said one or more users is allowed access by said level of sharing.

* * * * *